United States Patent
Koschany et al.

(10) Patent No.: US 6,183,898 B1
(45) Date of Patent: Feb. 6, 2001

(54) GAS DIFFUSION ELECTRODE FOR POLYMER ELECTROLYTE MEMBRANE FUEL CELLS

(75) Inventors: Arthur Koschany, Pöcking; Thomas Schwesinger, Kirchroth; Christian Lucas, Planegg; Georg Frank, Tübingen; Gregor Deckers, Frankfurt; Thomas Soczka-Guth, Hofheim; Harald Bönsel, Waldems, all of (DE)

(73) Assignee: Hoescht Research & Technology Deutschland GmbH & Co. KG, Frankfurt (DE)

(*) Notice: Under 35 U.S.C. 154(b), the term of this patent shall be extended for 0 days.

(21) Appl. No.: 09/388,597

(22) Filed: Sep. 2, 1999

Related U.S. Application Data

(63) Continuation of application No. 09/077,276, filed on Feb. 10, 1999, now abandoned.

(30) Foreign Application Priority Data

Nov. 28, 1995 (DE) ............................................. 195 44 323

(51) Int. Cl.[7] .................................................. H01M 4/86
(52) U.S. Cl. ............................... 429/42; 429/44; 502/101; 204/283; 29/623.1
(58) Field of Search ........................ 429/44, 42; 502/101; 204/283; 29/623.1

(56) References Cited

U.S. PATENT DOCUMENTS

| | | | |
|---|---|---|---|
| 4,804,592 | 2/1989 | Vanderborgh et al. | 429/33 |
| 5,399,184 | 3/1995 | Harada | 29/623.4 |
| 5,521,020 | 5/1996 | Dhar | 429/42 |
| 5,863,673 | 1/1999 | Campbell et al. | 429/44 |

FOREIGN PATENT DOCUMENTS

| | | |
|---|---|---|
| 0176831 A2 | 4/1986 | (EP) |
| 0298690 A1 | 1/1989 | (EP) |
| 0560295 A1 | 9/1993 | (EP) |
| 0577291 A1 | 1/1994 | (EP) |
| 0687023 A1 | 12/1995 | (EP) |
| 1542346 | 10/1968 | (FR) |
| 2258007 | 8/1975 | (FR) |
| 2000363 | 1/1979 | (GB) |

OTHER PUBLICATIONS

Derwent Publication, Week 9437. Patent Abstracts of Japan JP6223835 dated Aug. 12, 1994.

*Primary Examiner*—Bruce F. Bell
(74) *Attorney, Agent, or Firm*—Frommer Lawrence & Haug

(57) ABSTRACT

A particularly inexpensive, homogeneous and porous gas diffusion electrode which comprises at least one electrically conductive, hydrophobic and gas-permeable gas diffusion layer, comprising a mechanically stable support material which is impregnated with at least one electrically conductive material having a bulk conductivity of $\geq 10$ mS/cm is produced. The gas diffusion electrode can be coated with a catalytically active layer. The electrodes of the invention are particularly suitable for use in fuel cells and electrolysis cells.

26 Claims, 1 Drawing Sheet

GAS DIFFUSION ELECTRODE FOR POLYMER ELECTROLYTE MEMBRANE FUEL CELLS

This application is a continuation of Ser. No. 09/077,276 filed Feb. 10, 1999, now abandoned.

The invention relates to a gas diffusion electrode and also a process for its production, a process for coating the gas diffusion electrode with a catalytically active layer and its use for fuel cells and electrolysis cells.

In polymer electrolyte membrane fuel cells, a gas diffusion electrode is used as electrode between polymer electrolyte membrane and current collectors, e.g. bipolar plates. It has the function of conducting away the current generated in the membrane and has to allow the reaction gases to diffuse through to the catalytic layer. In addition, the gas diffusion electrode should be water-repellent at least in the layer facing the membrane in order to prevent water formed in the reaction from flooding the pores of the gas diffusion electrode and thus blocking gas transport to the catalytically active layer. For many applications, for example in space travel and for use in automobiles, it is also important that the materials used for constructing the cell stack are light and take up little space but nevertheless have a high mechanical stability. Very inexpensive production of the materials is always of interest.

For such gas diffusion electrodes, use has hitherto typically been made of materials comprising graphitized fabric or graphitized papers which are produced via an expensive thermal treatment (up to over 200° C.) (E-Tek, Inc. 1995 Catalogue, E-Tek, Inc. Natick. Mass. 01760, USA). The gas diffusion electrodes comprising graphitized fabric often do not allow oxygen, particularly atmospheric oxygen under low pressure, to diffuse sufficiently well and are also relatively heavy. The dense structure is necessary to obtain sufficient mechanical strength and a sufficiently high conductivity of the fabric perpendicular to the fiber direction. Their production requires high temperatures and an exact reaction procedure which leads to a correspondingly high energy consumption and high prices. The graphitized papers have the disadvantage that they are brittle and not flexible and the pore structure of these papers is fixed and cannot be changed without influencing the conductivity.

Also known are gas diffusion electrodes which comprise a hydrophobic, porous support material which is sufficiently electrically conductive for fuel cells, an intermediate layer which is not catalytically active and comprises an electron conductor material, and a catalytically active layer (EP-A-0 687 023). The intermediate layer which is not catalytically active here comprises a mixture of an electron-conducting ionomer and a proton-conducting ionomer. At a platinum loading of 0.21 mg/cm$^2$, an H$_2$ pressure of 1.25 bar (absolute) and an air pressure of 1.8 bar (absolute), a fuel cell using the gas diffusion electrodes described can only achieve a maximum output of 200 mW/cm$^2$ or an output of 163 mW/cm$^2$ at a cell voltage of 0.6 V (Example 2, Table).

SUMMARY OF THE INVENTION

It is an object of the present invention to provide a gas diffusion electrode which is inexpensive to produce but mechanically stable, allows oxygen, in particular oxygen from the air under a low superatmospheric pressure, to diffuse readily, also has the necessary high electrical conductivity and is mechanically stable and water-repellent.

It is an additional object of the invention to provide a process for producing such a gas diffusion electrode.

It is also an object of the invention to provide a process for coating a gas diffusion electrode with a catalytically active layer and to indicate the use of the gas diffusion electrodes of the invention in fuel cells and electrolysis cells.

These objects are achieved by the gas diffusion electrode as set forth below.

DETAILED DESCRIPTION OF THE PREFERRED EMBODIMENTS

Figure 1:
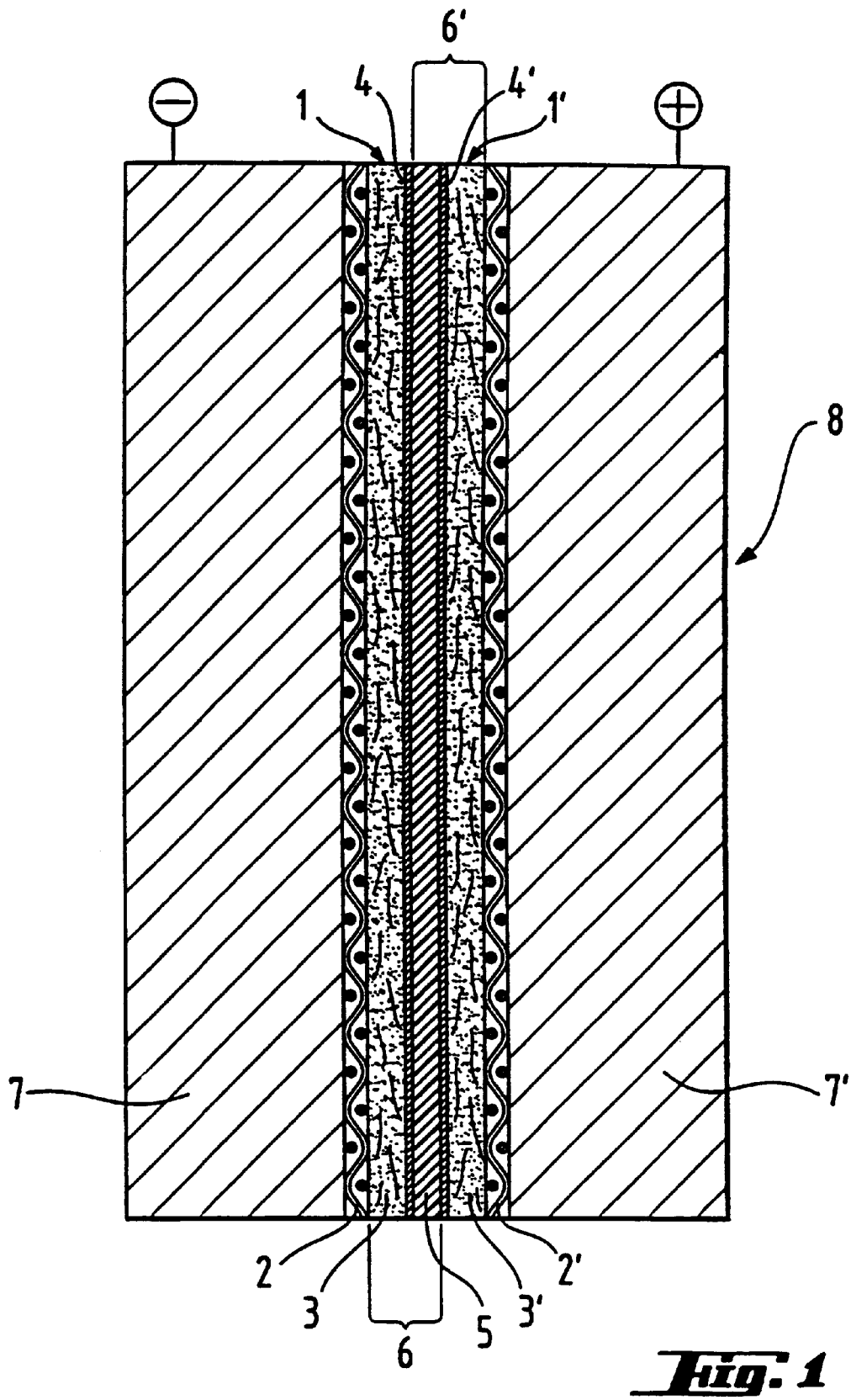
FIG. 1 shows a polymer electrolyte membrane fuel cell according to the invention.

The gas diffusion electrodes according to the invention are suitable for fuel cells, in particular polymer electrolyte membrane fuel cells, and polymer electrolyte membrane electrolysis cells. In polymer electrolyte fuel cells, the gas diffusion electrodes of the invention can be used both as an anode and as cathode. The gas diffusion electrodes of the invention can be particularly advantageously used in polymer electrolyte membrane fuel cells which use hydrogen as fuel and air as oxidant and are operated at a low pressure of less than 0.5 bar above ambient pressure, preferably less than 0.1 bar above ambient pressure.

The gas diffusion electrode of the invention comprises at least one gas diffusion layer comprising a mechanically stable support material which is impregnated with at least one electrically conductive material having a bulk conductivity of $\geq 10$ mS/cm$^2$. In this context, the term "impregnated" means that the pores (interstitial spaces between the fibers) of the support material are essentially homogeneously filled with the electrically conductive material.

In a preferred embodiment, the gas diffusion electrode of the invention comprises from one to four gas diffusion layers.

The starting materials used for the gas diffusion electrodes of the invention are very light, not necessarily electrically conductive but mechanically stable support materials which comprise fibers, e.g. in the form of nonwovens, papers or woven fabrics. The support material preferably comprises carbon fibers, glass fibers or fibers comprising organic polymers, for example polypropylene, polyester (polyethylene terephthalate), polyphenylene sulfide or polyether ketones, to name but a few. Particularly well suited materials are those having a weight per unit area of <150 g/m$^2$, preferably a weight per unit area in the range from 10 to 100 g/m$^2$. When using carbon materials as support materials, nonwovens made of carbonized or graphitized fibers and having a weight per unit area in the preferred range are particularly suitable. The use of such materials gives two advantages: firstly, they are very light and, secondly, they have a high open porosity. The open porosity of the support materials which are preferably used is in the range from 20 to 99.9%, preferably from 40 to 99%, so that they can be very easily filled with other materials and, as a result, the porosity, conductivity and the hydrophobicity of the finished gas diffusion layer can be set in a targeted manner by means of the filling materials, indeed over the entire thickness of the gas diffusion layer.

To produce a gas diffusion electrode comprising at least one conductive, hydrophobic and gas-permeable gas diffusion layer according to the invention, a suspension is first prepared from an electrically conductive material, preferably in powder form, which comprises, for example, carbon (e.g. as carbon black) or else a metal which is insoluble or only very slightly soluble in water and has a low oxidation sensitivity, e.g. Ti, Au, Pt, Pd, Ag or Ni, and at least one liquid (e.g. water or low ($C_1$–$C_4$) alcohols). The electrical bulk conductivity of the electrically conductive materials used is, in particular, $\geq 10$ mS/cm², preferably $\geq 100$ mS/cm². The particle size is, in particular, in the range from 10 nm to 0.1 mm, preferably in the range from 50 nm to 0.05 mm. It can also prove to be advantageous to use mixtures of various conductive powders or powders of alloys of conductive materials such as stainless steel.

To reduce the surface tension, it is possible to add materials (additives or detergents) such as lower alcohols. Such additives improve the ability to prepare the suspension since they improve the wettability of the electrically conductive material, e.g. the carbon black or the metal powder, and thus make it more miscible with the suspension liquid. This suspension, if desired also a plurality of such suspensions, is intensively mixed with at least one suspension or solution of a binder material, e.g. thermally stable polymers such as perfluorinated polymers (fluorinated ethylene-propylene copolymers or polytetrafluoroethylene), polyether ketones, polyether sulfones, polysulfones, polybenzimidazoles, polyphenylene sulfides, polyimide, polyamide or polyphenylene oxides, in at least one liquid, in particular water, N-methylpyrrolidone, dimethylacetamide, dimethyl sulfoxide. The inherent viscosity of the suspension (electrically conductive material, binder material and solvent) is preferably in the range 5–0.01 dl/g, in particular in the range 2–0.05 dl/g.

Depending on the desired hydrophobicity of the gas diffusion layer, it is also possible to use a plurality of the binders in admixture, e.g. additional use of perfluorinated polymers in combination with a non-fluorinated binder. The binder materials and the electrically conductive material are preferably used in a mass ratio of from 1:100 to 100:1, particularly preferably in the range from 1:50 to 50:1.

The abovementioned support materials are thoroughly soaked with the suspension mixture or the mixture is uniformly applied to the support material so that the support material is essentially homogeneously impregnated. The green gas diffusion layer produced in this way is subsequently dried; the temperatures required for drying depend on the type of liquids used and the support and binder materials used. In general, drying at temperatures above room temperature is advantageous, e.g. at temperatures above 80° C., with drying being able to be carried out either in air or under inert gas. The impregnation and drying of the support material can be repeated one or more times. The support material which has been impregnated in this way is subsequently sintered at a temperature of at least 200° C. in order to obtain an intimate bond between the support material and the electrically conductive material, but also within the conductive material itself. Sintering can likewise be carried out in air or under inert gas. Depending on the stability of the materials used, preference is given to sintering at temperatures above 300° C. The ratio of the weight per unit area of the finished gas diffusion layer to the support material used is in the range from 1.05 to 50, preferably in the range from 1.2 to 20.

The gas diffusion layer obtained in this way is particularly homogeneous, porous and nevertheless mechanically very stable. This is achieved by separating the mechanical stability function provided by the support materials from the conductivity function provided by impregnation with the conductive materials. Owing to the adjustable porosity, the gas diffusion layer inhibits the diffusion of the gases required, in particular the oxygen from the air, to a lesser extent than do the customarily graphitized fabrics or papers. Owing to the intimate bond of the support material to the conductive material achieved by means of the sintering step, the conductivity of the gas diffusion layer of the invention is also comparable with that of graphitized fabrics or papers and is sufficient for use in fuel cells or electrolysis cells. Addition of a hydrophobicizing agent (e.g. fluorinated polymers such as polytetrafluoroethylene or fluorinated ethylene-propylene copolymers) to the suspension comprising the conductive material enables a very uniform hydrophobicization to be achieved over the cross section of the gas diffusion layer. This leads to improved transport of the product water in a fuel cell from the gas diffusion layer and thus out from the gas diffusion electrode, and therefore leads to a further improvement in the gas transport, in particular for the oxygen from the air.

To produce the finished gas diffusion electrode, one or more layers, preferably from one to four layers, of the gas diffusion layers described can be used. If more than one layer is used, it is advantageous to bond these layers intimately to one another by means of a pressing or lamination step, preferably at elevated temperature.

The gas diffusion electrode produced as described above can then be used, for example, in a polymer electrolyte membrane fuel cell. Since the above-described electrode does not contain a catalytically active layer, it can be used in combination with a catalyst-coated membrane. As an alternative, however, the gas diffusion electrode of the invention can also be coated with a catalytically active layer.

The catalytic layer according to the invention has to be gas-permeable, have electrical conductivity and $H^+$ ion conductivity and, of course, catalyze the desired reaction. These properties are obtained according to the invention when the catalytically active layer is made very thin, preferably having a thickness of from 1 to 100 µm, preferably 3–50 µm.

This layer comprises a.) at least one catalytically active material, b.) one or more ion-conductive polymers, preferably selected from the group consisting of sulfonated polyaromatics (e.g. polyether ketones, polyether sulfones or polyphenylene sulfides), polybenzimidazoles and sulfonated, perfluorinated polymers such as Nafion® (DuPont) or Flemion® (Asahi Glass), and, if desired, c.) one or more hydrophobic materials, e.g. fluorinated polymers such as polytetrafluoroethylene, polyfluorinated ethylene-propylene copolymers or partially fluorinated polymers such as polytrifluorostyrene. The ion-conducting polymers can be processed in the form of suspensions or solutions in suitable solvents.

As catalytically active material, preference is given to noble metal catalysts; in particular, the catalytically active material comprises at least one metal of transition group VIII, e.g. platinum. Further preferred materials are alloys of one or more metals of transition group VIII, in particular comprising elements of transition group IV, where the content of the metal of transition group VIII, e.g. Pt, in the alloy is in the range from 20 to 95%, preferably from 30 to 90%.

The catalytically active materials (catalyst) can be supported or unsupported. If a supported catalyst is used, the noble metal loading on the support material is above 1% by weight, preferably above 2% by weight A very favorable noble metal loading in the catalytically active layer is less than 1 mg/cm², preferably below 0.5 mg/cm² and particularly preferably below 0.3 mg/cm² of the gas diffusion electrode. The mass ratio of catalytically active material:ion-conducting polymer is typically in the range from 1:100 to 100:1, preferably in the range from 1:10 to 20:1.

When using supported catalysts, preference is given to using carbon as support material. The carbon support of the catalyst is electrically conductive and porous, so that sufficient conductivity and gas-permeability of the catalytic layer is ensured. The proton-conducting polymer simultaneously serves as binder for the layer. The low layer thickness according to the invention guarantees short transport paths and thus low transport resistances for all materials required: electrons, $H^+$ ions and gas.

According to the invention, a gas diffusion electrode is coated as follows on one surface with a catalytically active layer: a catalytically active material, e.g. 20% of Pt on 80% of carbon (carbon black), is intensively mixed with one or more dissolved or suspended ion-conducting polymers (ionomers). The ion-conducting polymers which can be used have already been described above by way of example. Suitable suspension media are particularly water and alcohols, in particular $C_1$–$C_5$-alcohols, or mixtures thereof. The suspension which comprises ionomer and catalyst can, if desired, be diluted with a suitable liquid, e.g. water. The suspension comprising the catalyst and the ionomer is applied to a sheet-like side of the gas diffusion electrode, e.g. by spraying, printing or brushing, and the layer which has been applied is then dried. It is usually advantageous, before application of the suspension, to evaporate part of the suspension medium mixture, e.g. part of the alcohols, advantageously at slightly elevated temperature. This step enables the surface tension of the suspension to be set such that the catalyst and ionomer components present in the suspension wet essentially only the surface of the gas diffusion layer, but do not penetrate into the interior of this gas diffusion layer. In order to further minimize the inward diffusion of the catalytically active layer, the gas diffusion layer can also be impregnated beforehand with a liquid, e.g. water or alcohol, so that the pores are then filled and penetration of the solution is prevented.

The layer which has been applied in this way is subsequently dried. The drying step of the catalytically active layer applied is usually carried out at temperatures of from 10° C. to 250° C., preferably from 15° C. to 200° C. and particularly preferably from 15° C. to 150° C. Drying can be carried out in air, but it is also possible to use other drying media, e.g. nitrogen or noble gases.

Particularly good adhesion of the catalytically active layer is obtained when the steps of application and drying are repeated one or more times. The catalytically active layer does not necessarily have to have a homogeneous thickness over its entire area on the gas diffusion layer; rather, it is sometimes even advantageous if the thickness of the layer is not the same everywhere, since this can reduce the roughness of the total electrode. The catalytically active layer does not necessarily have to have a homogeneous composition over its entire thickness; rather, it is usually more favorable if there is a concentration gradient of electrically conductive and ion-conductive material perpendicular to the successive layers. Particularly when the catalytically active layer is applied in a plurality of steps, as described above, selection of different, suitable concentrations of catalytically active material and ion-conducting polymer in the suspension makes it readily possible to obtain layers whose concentration of catalytically active material decreases perpendicular to the catalytic layer with increasing distance from the support material and whose concentration of ion-conducting polymer increases, i.e. those at the interface with the gas diffusion layer are rich in catalyst and electron conductors but those on the free surface of the electrode which is later coupled to the proton-conducting membrane are rich in ionomer, which optimizes coupling of the electrode to the membrane.

Such a distribution of electron conductor, catalyst and ion-conducting polymer is also advantageous in that it is matched to the necessary different concentrations of electrons and ions in the catalytically active layer. Looking at the anode, for example, the fuel gas passing from the gas diffusion layer into the catalytically active layer will be ionized to an increasing extent over the catalyst on its way through the catalytically active layer in the direction of the polymer electrolyte membrane, so that the concentration of ions and thus the need for ion-conducting material in the regions of the catalytically active layer dose to the membrane is higher than in the regions adjoining the carbon fiber nonwoven. On the other hand, the concentration of electrons and thus the need for electron conductors is lower in the regions close to the membrane, since the total number of electrons liberated does not pass through these regions, but only the electrons liberated in the ionization of the neutral tailgas still present in the respective region. Analogously, in the catalytically active layer of the cathode, the oxidation gas is ionized to an increasing extent by uptake of electrons on its way through the catalytically active layer, so that, here too, in regions close to the membrane the concentration of ions is higher and the concentration of electrons is lower than in regions away from the membrane.

The process of the invention for coating with the catalytically active layer can be employed for any uncatalyzed gas diffusion electrode, in particular for the gas diffusion electrode of the invention.

The gas diffusion electrode of the invention can be mechanically reinforced by means of an electrically conductive mesh on the side opposite to that with the catalytically active layer. Suitable meshes are metal meshes, but also metal-coated meshes made of polymers such as polyesters, polyether ketones, polyether sulfones, polysulfones or other polymers which have continuous use temperatures above 100° C. Metals suitable for the meshes or the coating are noble metals such as Pt, Au, Ag, Ni or stainless steels or carbon. The metal meshes can also be made of lower priced materials such as steel if use is made of a protective coating of noble metals or nickel. Particularly suitable meshes for the purposes of the invention are square-mesh woven meshes having a mesh opening of from 0.4 to 0.8 mm and a wire thickness of from 0.12 to 0.28 mm, preferably of nickel. Nickel is a favorable material in that it is chemically inert under the conditions in the fuel cell and has a sufficiently low junction resistance to the gas diffusion electrode. When assembling the fuel cell, the mesh is installed on the side of the gas diffusion electrode away from the membrane. Its functions are to ensure sufficient offtake of current with a low junction resistance to the gas diffusion electrode, to distribute the gases sufficiently uniformly over the area of the gas diffusion electrode and at the same time to press the electrode uniformly against the membrane.

If necessary, one or more gas diffusion layers can be combined into one gas diffusion electrode. The use of more than one of the above-described gas diffusion layers superposed on one another reduces, for example, the danger of the mesh and/or parts of the current collectors, e.g. the bipolar plates, pressing through to the membrane and damaging the latter. Typically, a total of two or three impregnated gas diffusion layers per electrode side are combined with one another. The use of more than four superposed gas diffusion layers can lead to the gas diffusion no longer being sufficient, which results in a decrease in the power output of the fuel cell. To achieve good adhesion of the gas diffusion layers to one another, the desired number of gas diffusion layers can be pressed together, employing pressures of up to 500 bar and temperatures of up to 400° C. Preferred conditions are pressures of up to 200 bar and temperatures of up to 200° C. The coating of one surface of such a gas diffusion layer with catalyst is best carried out after forming the intimate bond between the individual layers by means of pressing.

One or more of the gas diffusion electrodes of the invention can be combined with a polymer electrolyte membrane to form a membrane-electrode unit As polymer electrolyte membrane, it is possible to use any membranes. Examples of these membranes are Nafion® (DuPont), Flemion®, (Asahi Glass), Gore-Select® (W. L. Gore & Assoc.), or membranes which are described, for example, in the following publication: "New Materials for Fuel Cell Systems 1", Proceedings of the 1st International Symposium on new materials for fuel cell systems, Montreal, Quebec, Canada, Jul. 9–13, 1995, Les Éditions de l'École Polytechnique de Montréal, pp. 74–94. Of particular interest are membranes without a fluorine content, since these offer a series of advantages from an environmental point of view. For optimum production of a membrane-electrode unit, the ionomer used for the production of the catalytically active layer should, where possible, be a type matched to the membrane: for coupling to a non-fluorinated membrane, e.g. of sulfonated polyether ketone, the ionomer present in the catalytically active layer should also be a sulfonated polyarylene. When using a perfluorinated membrane, a perfluorinated ionomer is also used in the active layer. However, other combinations of ionomer in the catalytically active layer and in the membrane lead to satisfactory membrane-electrode units. Depending on whether the gas diffusion electrode bears a catalytically active layer or not, it is possible to use a membrane without or with a catalytically active layer, where both parts can naturally also bear a catalytic layer on their surfaces, so that the bond is then established in the catalytic layer. To produce a membrane-electrode unit, a gas diffusion electrode, which can be built up of one or more impregnated gas diffusion layers, is placed on one side of a polymer electrolyte membrane in its $H^+$ form and subsequently pressed on at pressures of up to 500 bar and temperatures of up to 250° C. Preferred conditions are pressures of up to 300 bar and temperatures of up to 200° C. If the gas diffusion electrode comprises the catalytically active layer, it is pressed onto the membrane in such a way that the catalytically active layer is in contact with the membrane. The contact between the electrodes on both sides of the membrane and the membrane can be established in this way. The electrodes can, as a matter of choice, be brought into contact with the membrane successively or simultaneously.

To produce the membrane-electrode units, the catalytically active layers between the gas diffusion layers and the membrane can be built up identically or can have different compositions. When using pure hydrogen (purity >99.9%), the catalyst content on the anode side can be selected so as to be significantly lower than on the cathode side. The choice of different catalytically active layers is of interest particularly when the fuel cell operates using fuels other than pure hydrogen. It is then advisable to use catalysts which, for example, have an increased CO-tolerance, e.g. catalysts comprising alloys of Pt with Ru, on the anode. In this case, too, it is appropriate to set different catalyst contents for anode and cathode. The establishment of an intimate bond in the abovementioned step significantly improves the electrical contact between the catalytically active layer on the membrane and the gas diffusion layer or between the catalytically active layer on the gas diffusion layer and the membrane compared to simple clamping together, so that the performance of the membrane-electrode unit in the fuel cell is increased. Before installation of the membrane-electrode unit in a polymer electrolyte membrane fuel cell, the gas diffusion electrodes can be reinforced by fitting a mesh on the side facing away from the membrane.

The gas diffusion electrode of the invention has, compared to the known gas diffusion electrodes, particularly low electrical surface resistances which are in the range of $\leq 100$ m$\Omega$/cm$^2$, preferably $\leq 60$ m$\Omega$/cm$^2$.

A particularly preferred embodiment of a fuel cell comprising a gas diffusion electrode of the invention is shown in FIG. 1. Anode 1 and cathode 1' are formed by the impregnated carbon fiber nonwovens 3 and 3'. Anode 1 and cathode 1' each bear a catalyst layer 4 or 4' on their sides facing the polymer electrolyte membrane 5. Anode 1 and cathode 1' together with the polymer electrolyte membrane 5 form the membrane-electrode unit 6 or 6'. On their sides facing away from the membrane, anode 1 and cathode 1' are reinforced by conductive meshes 2 and 2' respectively. The bipolar plates 7 and 7' form the outside of the cell on the anode and cathode sides respectively.

Membrane-electrode units (MEUs) which comprise the gas diffusion electrodes of the invention are suitable under all operating conditions for fuel cells, i.e. they can be used with or without superatmospheric pressure, at high and low gas flows and at temperatures up to 100° C. Typical power densities in operation using hydrogen and air are, depending on operating conditions, up to 900 mW/cm$^2$, in operation using hydrogen and oxygen even up to 1.8 W/cm$^2$.

Examples of the production and the properties of the gas diffusion electrode of the invention:

EXAMPLE 1

45 g of carbon black (Vulcan XC 72®) are suspended in 450 ml of water and 495 ml of isopropanol. This suspension is intensively mixed with 32.17 g of a polytetrafluoroethylene (PTFE) suspension (60% of Hostaflon® fibers in aqueous suspension, manufactured by Hoechst AG, product number TF5032). The resulting mixture is painted uniformly onto a carbonized carbon fiber nonwoven (30 mg/m$^2$) and the nonwoven is subsequently dried at about 70° C. The painting and drying are repeated twice. After the last drying, the impregnated carbon fiber nonwoven is sintered at 400° C. for about 15 minutes. This gives a carbon fiber nonwoven which is impregnated virtually uniformly over the total thickness and the total area with Vulcan XC 72 and Hostaflon.

Coating of the gas diffusion electrode with a catalytically active layer 0.6 g of noble metal catalyst on a carbon support (20% Pt, 80% C) are intensively mixed with 4.0 g of a 5% strength Nafion® solution (Nafion dissolved in lower aliphatic alcohols and water) and 10.0 g of water. 2 g of the alcohols present are then evaporated at 50° C. in order to increase the surface tension of the suspension. The suspension is then sprayed onto an impregnated carbon fiber nonwoven and subsequently dried at 80° C. The spraying and drying is repeated twice. This results in a gas diffusion electrode coated with catalyst and having a Pt loading of about 0.2 mg/cm$^2$.

Production of an MEU having a NAFION 115® membrane:

The membrane-electrode unit (MEU) having a Nafion 115® membrane in the $H^+$ form, which is, however, not preconditioned, is produced by constructing a sandwich consisting of an above-described electrode, the membrane and a further above-described electrode. The sandwich is then pressed at a temperature of 130° C. for 90 seconds at 250 bar and an intimate bond is thus produced (MEU).

Results on the MEU in a fuel cell:

The performance of the MEU produced in this way was then studied in a test cell. The fuel cell was operated under the following conditions: $H_2$ gauge pressure 0.5 bar, not humidified, air gauge pressure about 60 mbar, air index 16, the air is humidified. The temperature of the cell was 65° C. Ni meshes are used as power conductors. After a running-in period of the MEU, during which the membrane accumulates the amount of water required for a high conductivity, the following performance data are obtained:

| Voltage (mV) | Current density (mA/cm$^2$) | Power density (mW/cm$^2$) |
|---|---|---|
| 1002 | 0 | 0 |
| 750 | 208 | 151 |
| 700 | 300 | 210 |
| 600 | 563 | 338 |
| 500 | 700 | 350 |

EXAMPLE 2

Production of a gas diffusion layer as in Example 1, but using a membrane of sulfonated polyether ether ketone ketone (PEEKK) having a thickness of 40 µm (measured in the dry state) and an ion-exchange equivalent of 1.46 mmol or $H^+$/g. After being produced, the membrane was boiled in deionized water for 2 hours and subsequently dried again under ambient conditions, so that the membrane was largely dry during installation. The electrodes from Example 1 were laid on both sides of the membrane and subsequently pressed at room temperature to form an MEU.

The MEU was installed in the test cell and operated under the following test conditions: cell temperature 80° C., $H_2$ gauge pressure <100 bar, humidification at 80° C., flow 2, air gauge pressure <100 mbar, air index 5.5, humidification at 80° C.

The following performance data were able to be achieved:

| Voltage (mV) | Current density (mA/cm$^2$) | Power density (mW/cm$^2$) |
|---|---|---|
| 980 | 0 | 0 |
| 750 | 132 | 99 |
| 700 | 240 | 168 |
| 600 | 520 | 312 |
| 500 | 710 | 355 |

EXAMPLE 3

Comparative Example 4 layers of the gas diffusion layer produced as described in Example 1 or 2 are installed as a circular sheet having an area of 12 cm$^2$ in a cell block of a fuel cell. The gas diffusion layers were then supplied with a current of 1 A/cm$^2$ and the voltage drop across the cell block was measured. The surface resistance of the gas diffusion layers including the junction resistances to the cell block is 40 mΩ/cm$^2$ when the parts are pressed together at a pressure of about 10 bar.

This experiment was repeated under identical conditions using the unmodified carbon fiber nonwovens employed as starting material. The resistance of the untreated carbon fiber nonwoven layers was 330 mΩ/cm$^2$ and thus about 8 times greater than the resistance of the gas diffusion layers produced according to the invention.

EXAMPLE 4

Use of a glass fiber nonwoven having a weight per unit area of 30 g/m$^2$, with the individual glass fibers having a diameter of 12 µm, as mechanical stabilization for the gas diffusion electrode. The surface resistance of the glass fiber nonwoven is greater than 100 kΩ/cm$^2$. To produce an electrode, two gas diffusion layers with glass fiber nonwoven were used. The production of the individual gas diffusion layers is carried out by a method similar to Example 1, i.e. the glass fiber nonwoven is impregnated as homogeneously as possible over its total thickness with a suspension of carbon black/PTFE, dried and then sintered. The formulation used for the suspension and the treatment steps are similar to Example 1. The finished gas diffusion electrodes are then provided on one side with a catalytically active layer, likewise similar to Example 1. The platinum content of the catalytically active layer is 0.2 mg/cm$^2$.

The surface resistance of the gas diffusion electrodes was 80 mΩ/cm$^2$, i.e. more than 10$^6$ times smaller than the resistance of the glass fibers alone!

To produce an MEU, two glass fiber electrodes produced in this way were pressed together with a Gore Select® membrane (40 µm) (from W. L. Gore & Assoc.) at 90° C. and 80 bar to form an MEU.

The performance of the MEU was then studied under the conditions of Example 1. This gave the following data:

| Voltage (mV) | Current density (mA/cm$^2$) | Power density (mW/cm$^2$) |
|---|---|---|
| 980 | 0 | 0 |
| 750 | 263 | 196 |
| 700 | 371 | 260 |
| 650 | 500 | 325 |
| 550 | 750 | 412 |

EXAMPLE 5

Production of the MEU using a method similar to Example 2, but the thickness of the membrane used is in this case only 25 µm. This MEU was studied under the following conditions:

Cell temperature: 50° C., use of hydrogen and oxygen at 3 bar absolute pressure and a flow of about 2. The humidifiers for $H_2$ and $O_2$ were operated at ambient temperature, i.e. 22° C., so that the gases were only about 30%-saturated with water vapor. This gave the following data:

| Voltage (mV) | Current density (mA/cm$^2$) | Power density (mW/cm$^2$) |
|---|---|---|
| 980 | 0 | 0 |
| 750 | 374 | 281 |
| 700 | 580 | 406 |
| 600 | 1000 | 600 |
| 500 | 1395 | 697 |

Here, for example, the output found at 700 mV was able to be maintained for a number of hours at the low humidification.

What is claimed is:

1. A gas diffusion electrode comprising at least one electrically conductive, hydrophobic and gas-permeable gas diffusion layer, wherein the gas diffusion layer comprises a mechanically stable support material which is impregnated with at least one electrically conductive material having a bulk conductivity of $\geq 10$ mS/cm$^2$, the mechanically stable support material has a weight per unit area of <150 g/m$^2$ and the gas diffusion electrode has an electrical surface resistance of $\leq 100$ mΩ/cm$^2$.

2. A gas diffusion electrode as claimed in claim 1, wherein the gas diffusion electrode comprises at least one gas diffusion layer in which the mechanically stable support material is a nonwoven, woven fabric or paper.

3. A gas diffusion electrode as claimed in claim 2, wherein the mechanically stable support material comprises carbon fibers, glass fibers or fibers comprising organic polymers.

4. A gas diffusion electrode as claimed in claim 1, wherein the support material has an open porosity in the range from 20 to 99.9%.

5. A gas diffusion electrode as claimed in claim 1, wherein the electrically conductive material comprises carbon and/or a metal.

6. A gas diffusion electrode as claimed in claim 1, which comprises from one to four gas diffusion layers.

7. A gas diffusion electrode as claimed in claim 1, which comprises a catalytically active layer.

8. A gas diffusion electrode as claimed in claim 7, wherein the catalytically active layer comprises
   a) at least one catalytically active material and
   b) one or more ion-conducting polymers and/or
   c) one or more hydrophobic materials.

9. A gas diffusion electrode as claimed in claim 8, wherein the catalytically active material is at least one metal of transition group VIII or an alloy of one or more metals of transition group VIII, including a metal of transition group IV.

10. A gas diffusion electrode as claimed in claim 8, wherein the mass ratio of catalytically active material:ion-conducting polymer is in the range from 1:100 to 100:1.

11. A gas diffusion electrode as claimed in claim 8, wherein the concentration of catalytically active material decreases perpendicular to the catalytic layer with increasing distance from the support material and the concentration of ion-conducting polymer increases.

12. A gas diffusion electrode as claimed in claim 1, which is mechanically reinforced by an electrically conductive mesh.

13. A gas diffusion electrode as claimed in claim 12, wherein the electrically conductive mesh is a metal mesh or comprises a metal-coated polymer.

14. A process for coating a gas diffusion electrode on one surface with a catalytically active layer, wherein a gas diffusion electrode as claimed in claim 1 is used and the coating procedure comprises the following steps:
   a) intensively mixing at least one catalytically active material with one or more dissolved or suspended ion-conducting polymers,
   b) applying the suspension prepared in step a) to one surface of the gas diffusion electrode,
   c) drying the layer applied.

15. The process as claimed in claim 14, wherein part of the suspension liquid is evaporated before application of the suspension prepared in step a).

16. The process as claimed in claim 14, wherein the steps b) and c) are repeated one or more times.

17. The process as claimed in claim 14, wherein suspensions having a different concentration of material and ion-conducting polymer are used in successive layers.

18. A membrane-electrode unit comprising an anode, a cathode and a polymer electrolyte membrane arranged between anode and cathode, wherein at least one of the electrodes is a gas diffusion electrode as claimed in claim 1.

19. A fuel cell or electrolysis cell comprising the gas diffusion electrode as claimed in claim 1.

20. A process for producing a gas diffusion electrode comprising at least one electrically conductive, hydrophobic and gas-permeable gas diffusion layer, which process comprises the following steps:
   a) preparing a suspension comprising an electrically conductive material and at least one liquid,
   b) preparing one or more suspensions or solutions from a binder material and at least one liquid,
   c) intensively mixing the suspension prepared in step a) with at least one of the suspensions prepared in step b),
   d) impregnating a mechanically stable support material with the mixture prepared in step c),
   e) drying the impregnated support material,
   f) sintering the impregnated support material at a temperature of at least 200° C.,
where the mechanically stable support material has a weight per unit area of <150 g/m$^2$ and the gas diffusion electrode has an electrical surface resistance of $\leq 100$ mΩ/cm$^2$.

21. The process for producing a gas diffusion electrode as claimed in claim 20, wherein the electrically conductive material has an electrical bulk conductivity of $\geq 10$ mS/cm$^2$.

22. The process for producing a gas diffusion electrode as claimed in claim 20, wherein the gas diffusion electrode comprises at least one gas diffusion layer in which the mechanically stable support material is a nonwoven, woven fabric or paper.

23. The process for producing a gas diffusion electrode as claimed in claim 20, wherein the step d) and e) are repeated one or more times.

24. The process for producing a gas diffusion electrode as claimed in claim 20, wherein one or more sintered gas diffusion layers are pressed together at a pressure of up to 500 bar and a temperature of up to 400° C.

25. The process for producing a gas diffusion electrode as claimed in claim 20, wherein the suspension prepared in step a) comprises a material for reducing the surface tension.

26. The process for producing a gas diffusion electrode as claimed in claim 20, wherein the binder material and the electrically conductive material are used in a mass ratio of from 1:100 to 100:1.

* * * * *